UNITED STATES PATENT OFFICE.

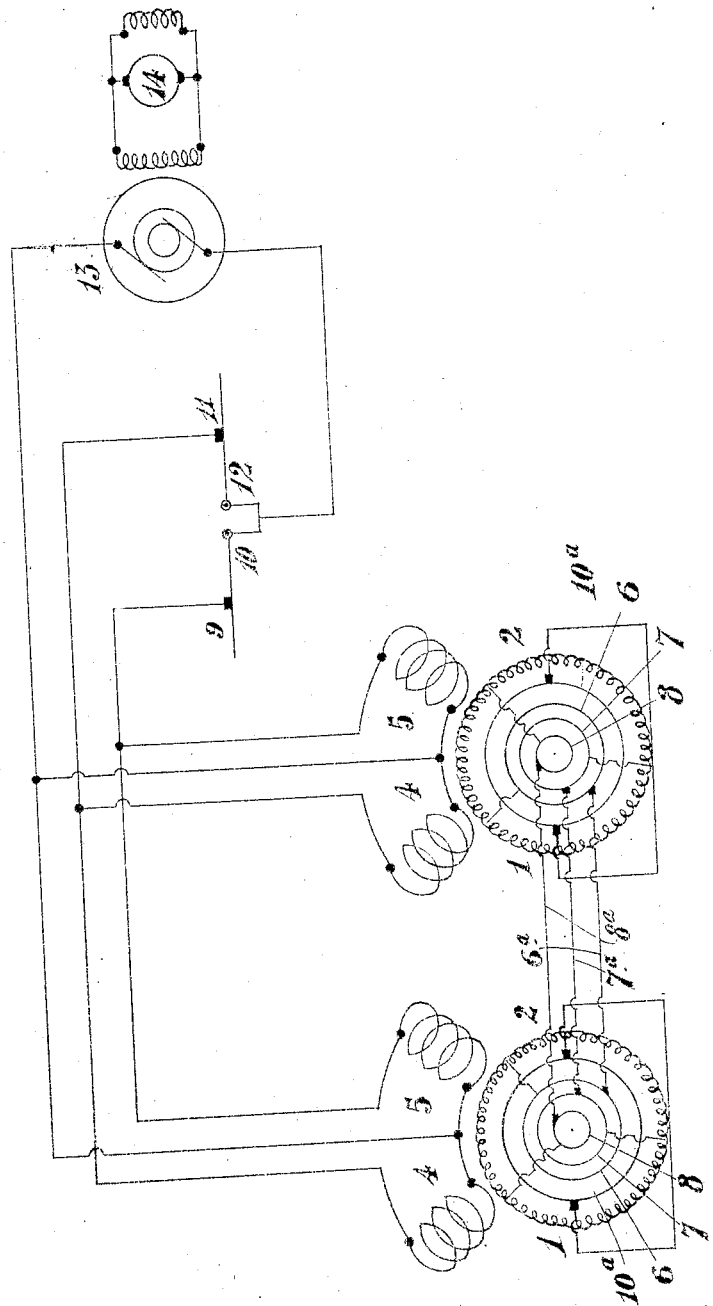

JOSEPH LOUIS ROUTIN, OF PARIS, FRANCE.

MEANS FOR COLLECTIVELY ACTUATING AND CONTROLLING ALTERNATING-CURRENT MOTORS.

1,142,274.   Specification of Letters Patent.   Patented June 8, 1915.

Application filed January 17, 1914. Serial No. 812,643.

*To all whom it may concern:*

Be it known that I, JOSEPH LOUIS ROUTIN, a citizen of the French Republic, residing at Paris, in France, have invented certain new and useful Improvements in Means for Collectively Actuating and Controlling Alternating-Current Motors, of which the following is a specification.

This invention relates to improvements in the apparatus described in my Patent No. 1,090,568, granted March 17, 1914, on application Serial No. 737087, filed on December 16th, 1912, entitled "Means for collectively actuating and controlling alternating current motors," and designed for the purpose of transmitting equal rotations to several receiving shafts separated from one another. The means referred to in my said previous application comprise a polyphase electric current generator, a plurality of asynchronous motors, switch mechanism and a rheostat, each of the receiving shafts being operated by means of one of said asynchronous motors provided with a rotor wound so as to connect the slip rings of the rotors and to connect the whole of said rotors to the rheostat which is of invariable resistance. The rheostat may be connected to the circuits of said rotors either permanently or only at the time when the motors are to be started. The first method has the inconvenience of causing a constant loss of energy and the second necessitates the use of a double switch in the rotor circuit.

The object of the present invention is to overcome these inconveniences.

It consists in principle in governing each of the receiver shafts by means of an asynchronous motor, the rotor of which is provided with a collector which is utilized in the usual manner and with slip rings connected to fixed points of its winding, whereby permanent connections may be established between all the rotors, by means of connecting wires. While remaining asynchronous with respect to the generator which feeds them, the motors have the same slip and are consequently synchronous to one another.

The annexed drawing diagrammatically illustrates the invention, the number of receivers being reduced to two.

Each receiver comprises a repulsion motor having certain features as follows: 1 and 2 are the brushes which rub on the commutator 10ª of the rotor 3 and which are connected in short circuit. 4 and 5 are two field coils which may be excited either together or separately and which are arranged, so that the magnetic fields corresponding to each are equally inclined with respect to the line of the brushes 1, 2. Brushes take the current from three rings 6, 7, 8, connected to three equidistant points of the coil of the rotor 3. The rings 6, 7, 8 of the several motors are connected by wires 6ª, 7ª, 8ª. The coils 4 are connected in parallel, as also are the coils 5. The switches 9, 10 and 11, 12 allow of passing through the coils 4 and 5, the current produced by a monophase generator 13 actuated by a dynamo 14. When the two switches are closed as shown in the diagram the field magnets are simultaneously excited and the resultant field is perpendicular to the line of the brushes and the motor couple is *nil*. To start the motors in one direction or the other it is sufficient to lower one of the levers 9—10 or 11—12. To assure the permanent connection of the receivers the levers 9—10 and 11—12 must never be lowered simultaneously.

What I claim as my invention and desire to secure by Letters Patent of the United States is:—

In combination a plurality of electric repulsion motors, each having a rotor, having a winding and a commutator connected thereto, two brushes on said commutator, a conductor whereby said brushes are short circuited upon themselves, a plurality of slip rings, conductors severally connecting said slip rings to equidistant parts of the winding on said rotor, and a stator having two windings disposed to produce fields at equal angles in relation to said brushes, together with conductors whereby the slip rings of each motor are severally connected to the slip rings of the other motor or motors, a monophase electric current generator, and means for supplying current from said generator to the stator windings of said motors, said current supplying means comprising switches whereby the two stator windings of each motor can be separately or collectively supplied with current.

In witness whereof I have signed this specification in the presence of two witnesses.

JOSEPH LOUIS ROUTIN.

Witnesses:
 HANSON C. COXE,
 HENRY SCIAMA.